United States Patent [19]

Kniel et al.

[11] 4,007,360
[45] Feb. 8, 1977

[54] METHOD AND APPARATUS FOR REMOTE TRANSMISSION OF SIGNALS

[75] Inventors: Roger Kniel, Uster; Hans de Vries, Illnau, both of Switzerland

[73] Assignee: Zellweger AG, Uster, Switzerland

[22] Filed: Dec. 3, 1973

[21] Appl. No.: 421,086

[30] Foreign Application Priority Data

Dec. 28, 1972  Switzerland ............. 18981/72

[52] U.S. Cl. .................... 235/152; 325/38 R; 325/63; 325/391
[51] Int. Cl.² .............. G06F 15/30; G01R 27/02
[58] Field of Search ........... 235/152; 325/37, 38, 325/42, 49, 63, 391, 392; 179/15 BP

[56] References Cited

UNITED STATES PATENTS

| | | | |
|---|---|---|---|
| 3,372,335 | 3/1968 | Takada | 325/49 |
| 3,590,380 | 6/1971 | Zegers et al. | 325/42 |
| 3,629,509 | 12/1971 | Glaser | 235/152 |
| 3,801,913 | 4/1974 | Daguet et al. | 235/152 |
| 3,803,390 | 4/1974 | Schaepman | 235/152 |

Primary Examiner—Malcolm A. Morrison
Assistant Examiner—Errol A. Krass
Attorney, Agent, or Firm—Werner W. Kleeman

[57] ABSTRACT

A method of, and apparatus for, the remote transmission of signals over a line, especially via an electrical energy supply network, wherein at the transmitter there is formed from a first auxiliary frequency delivered to the transmitter a signal frequency which is in a predetermined first relationship to the first auxiliary frequency, an auxiliary signal characteristic of the first auxiliary frequency and the signal frequency are transmitted via the same transmission channel or via different transmission channels to at least one receiver, and at the location of the receiver there is formed from the signal characteristic of the first auxiliary frequency a second auxiliary frequency which is in a predetermined second relationship to the first auxiliary frequency, and such second auxiliary frequency is delivered to a sampling filter for controlling its throughpassage characteristics.

10 Claims, 10 Drawing Figures

METHOD AND APPARATUS FOR REMOTE TRANSMISSION OF SIGNALS

BACKGROUND OF THE INVENTION

The present invention relates to a new and improved method of, and apparatus for, the teletransmission or remote transmission of signals.

The prior art is acquainted with remote control techniques where remote control commands are transmitted through the agency of alternating-current pulses or alternating-current pulse sequences. This is so for instance with remote control or signal transmission via high-current power supply networks, especially in the audio-frequency power line carrier control art. Thus, alternating-current pulses of a remote control frequency $f_s$ are superimposed upon an energy or power supply network having the network frequency $f_N$. The transmission of a signal via a power supply network, for instance an intermediate voltage heavy-current network or a low voltage heavy-current network, in comparison to signal transmission via conventional communication channels, is associated with quite special problems.

While there is present the advantage of the wide dissemination or expanse of an energy supply network and thus the possibility of remotely controlling by means of the aforementioned signals a large number of apparatuses and current loads connected to such network, there is nonetheless present a high noise level of the high-current or heavy-current network as the communication transmission channel. The noise level of an alternating current-high-current power network is primarily constituted by disturbance frequencies which are certain harmonics of the network frequency $f_N$. Oftentimes there however also occur transient disturbance voltages.

In view of the fact that in an alternating-current high-current network the network frequency $f_N$ is not constant as a function of time, it equally follows that the harmonics of the network frequency as the disturbance frequency are equally not constant as a function of time. With the selection of a suitable remote control frequency $f_S$ this condition must be taken into account. In consideration of the high noise level of the high-current network serving as the transmission channel it is additionally advantageous to select the band width of the receiver as narrow as such can be coordinated with the character of the information to be transmitted. Owing to this narrow band width it is therefore also necessary to undertake measures to insure that the throughpass frequency of the receiver, i.e., its response frequency always coincides as closely as possible with the actual transmitted remote control frequency $f_S$. In consideration of the fluctuations of the network frequency $f_N$ it has been found to be advantageous to percentually change the remote control frequency $f_S$ transmitted via the high-current network to the same degree and in the same sense as the network frequency $f_N$. The remote control frequency $f_S$ therefore is always in a fixed relationship to the network frequency $f_N$. Due to these measures, during fluctuation of the network frequency, there is maintained the percentual difference or spacing of the remote control frequency $f_S$ from the neighboring harmonics of the network frequency $f_N$, which occur as disturbance frequencies. Moreover, there are already known to the art techniques for the adjustment of the receiver response frequency to the fluctuating remote control frequency $f_S$, and in this regard attention is directed to for instance Swiss Pat. No. 424,968. According to this technique the receiver response frequency is formed by a mixing process with the assistance of a pilot frequency $f_P$, this pilot frequency $f_P$ being in the same relationship to the network frequency $f_N$ as the remote control frequency $f_S$.

However, a drawback of this state-of-the-art technique is the dependency of the magnitude of the output signal of the receiver upon the phase position, which is variable and not predeterminable, between the received remote control signal and the pilot frequency $f_P$ generated at the receiver location, preferably from the network frequency.

SUMMARY OF THE INVENTION

Hence, from what has been discussed above it will be recognized that this particular field of technology is still in need of an improved method of, and apparatus for, the remote transmission of signals which is not associated with the aforementioned drawbacks and limitations of the prior art proposals. Hence, it is a primary object of the present invention to provide an improved method of, and apparatus for, the remote transmission of signals which effectively and reliably fulfills the existing needs in the art.

Another and more specific object of the present invention relates to a new and improved method of, and apparatus for, the remote transmission of signals via a conductor or line in which, on the one hand, the signal frequency generated at the side of the transmitter is always in a predetermined relationship to an auxiliary frequency, preferably a network frequency and, on the other hand, the receiver response frequency always possesses the same predetermined relationship to the aforementioned auxiliary frequency, preferably the network frequency, as the signal frequency $f_S$, and the intensity of the output signal of the receiver is essentially independent of the momentary phase position of the received signal.

Instead of the first auxiliary frequency itself there generally also can be simply transmitted a signal characteristic of such frequency, this characteristic signal likewise being in a certain relationship to the first auxiliary signal. As the conductor there can be employed a high-current or heavy-current network, but also a signal- or remote-control line provided for instance for other purposes. The difficulties which arise at the receiver end with unstable remote control frequency and unstable receiver response frequency and the use of a small band width with respect to this instability should be avoided through an automatic readjustment or shifting of the receiver response frequency to the remote control frequency which is to be expected.

Now in order to implement the aforementioned objects and others which will become more readily apparent as the description proceeds the invention is concerned with a new and improved method for the remote transmission of signals via a conductor or line, especially via an electrical energy supply network, and the method aspects of this development are manifested by the features that at the side of the transmitter there is formed from a first auxiliary frequency $f_{H1}$ delivered to a transmitter a signal frequency $f_S$ which is in a first predetermined relationship to the first auxiliary frequency $f_{H1}$ and that an auxiliary signal characteristic of the first auxiliary frequency $f_{H1}$ and the signal frequency $f_S$ are transmitted via one and the same transmission channel or via different transmission channels to at least one receiver, and that at the side of the receiver there is formed from the signal characteristic of the first auxiliary frequency $f_{H1}$ a second auxiliary frequency or clock frequency which is in a predetermined second relationship to the first auxiliary frequency, and which second auxiliary frequency or clock frequency is delivered to a sampling filter for the purpose of controlling its throughpass characteristics.

As already mentioned above not only is the invention concerned with the aforementioned method aspects but also deals with a new and improved construction of apparatus for the performance of the aforesaid method which is manifested by the features that at the side of the transmitter there is provided a transmitter controlled by a first auxiliary frequency for generating a signal frequency which is in a first predetermined relationship to such auxiliary frequency, furthermore there is provided at least one transmission channel for a signal characteristic of the first auxiliary frequency and for the signal frequency between the transmitter and the receiver, and that at the side of the receiver there is provided a receiver with at least one sampling filter, which sampling filter has delivered thereto the first auxiliary frequency or a clock frequency derived therefrom as a sampling pulse and the signal frequency as the received signal, and wherein the transmission function of the sampling filter can be changed by the aforementioned clock frequency.

BRIEF DESCRIPTION OF THE DRAWINGS

The invention will be better understood and objects other than those set forth above, will become apparent when consideration is given to the following detailed description thereof. Such description makes reference to the annexed drawings wherein.

DETAILED DESCRIPTION OF THE PREFERRED EMBODIMENTS

Figure 1:
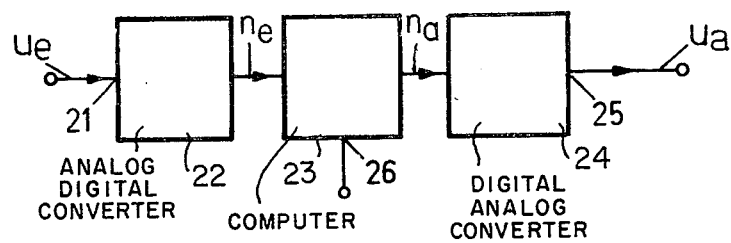
FIG. 1 is a principal block circuit diagram of a digital sampling filter.

Considering now the drawings, it is to be understood that corresponding components have been designated throughout with the same reference characters, and further it is to be noted that reference numerals below 20 have been used for the designation of the connection terminals of integrated circuits of specific constructional type in conjunction with the data listed in the corresponding manufacturer's catalog. According to the invention the selectivity required at the side of the receiver is realized by at least one sampling filter. In the context of this disclosure the term "sampling filter" is generically employed in its broadest sense to designate such filters of the type wherein a received signal having a frequency greater than the highest frequency to be filtered is sampled, and the result of the sampling operation is further processed in analog or digital manner into an output signal. For instance, an N-path filter constitutes an analog operating sampling filter. However, there are also analog operating sampling filters in the nature of transverse filters with so-called bucket chain circuits; also in this classification are digital filters.

Sampling filters of the aforementioned species exhibit, apart from the signal input, at least one control input. The transmission function of such filters can be changed as a function of the frequency of an infed control voltage or control voltages. Moreover, the phase relationship existing between the input signal and the control signal or control signals does not have any, or only a practically negligible influence upon the intensity of the output signal. It is especially this last-mentioned characteristic which is particularly important for a filter in order to realize the objectives constituting basic aspects of the present invention.

Owing to the periodic nature of the transmission function of any given type of sampling filter for many applications, thus for instance in the audio-frequency power line carrier control art, it is necessary to provide forwardly of the sampling filter a pre-selection filter.

Now FIG. 1 illustrates a principal block circuit diagram of a digital sampling filter which in consideration of the Shannon theorem can replace an analog filter. In FIG. 1 reference numeral 21 designates an input terminal for an analog input signal $u_e$, reference character 22 designates an analog-digital converter which converts the delivered analog input signal $u_e$ into a number $n_e$ in the form of a digital signal. The value $n_e$ is delivered as an input number to a computer 23 which as a function of its program forms an output number $n_a$. This output number $n_a$ is again converted at a subsequently connected digital-analog converter 24 into an analog output signal $u_a$ at an output terminal 25. The analog-digital converters and digital-analog converters used in the system of the invention are conventional, as exemplified for instance in Bulletin 590-2-2 and Bulletin 371—1-2 of Hybrid Systems Corporation, Burlington, Mass., to which reference may be readily had and incorporated herein by reference.

The computer 23, on the basis of a momentary input number or value $n_e$ and previously stored input numbers, or values, as well as on the basis of the momentary output number or value $n_a$ and past output numbers or values, calculates a new output number or value, and, in fact the computer will only calculate a new output number when the command to do so is delivered thereto by means of an infed clock pulse. Such clock pulses can be delivered to the computer 23 from a clock generator to a clock input 26. Hence, the following relationships are valid between the input number $n_e$ and the output number $n_a$ as a function of the infed clock pulses $v$ $$n_a(v) = F\ [f_{11}\ \{n_e(v)\},\ f_{12}\ \{n_e(v-1)\},\ \ldots\ \ldots,\ f_{21}\ \{n_a(v)\}, f_{22}\ \{n_a(v-1)\}\ \ldots]$$

p

For this equation the aforementioned symbols represent the following:

$n_e$ = input number $n_a$ = output number
$v$ = number of clock pulses
$F$ = function of the expression enclosed within the brackets [ ]

Figure 2:
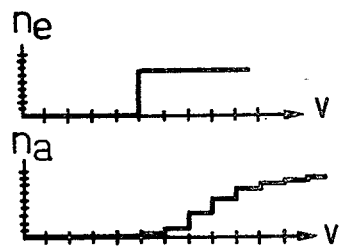
FIG. 2 graphically illustrates the step response of a digital low-pass filter.

$\left.\begin{array}{l}f_{11}\\f_{12}\\f_{21}\\f_{22}\end{array}\right\}$ selectable functions of $v$ Therefore it is apparent that for a computer which has been programmed in a predetermined manner the value $n_a$ is only a function of the values $n_e$ and $v$. If it is assumed that the computer 23 is programmed such that the transmission function constitutes that of a filter of the first order, then the step response of the filter is of the type depicted in FIG. 2. Depending upon whether the clock pulses are delivered rapidly or slowly, i.e., depending upon whether the clock frequency is high or low, the system constituted by the computer has a small or large time-constant. Since by varying the clock frequency it is also possible to change the time-constant of a system i.e. a filter of the first order, it is also possible to alter its transmission function, that is its frequency response. By means of cascade circuits and feedback of a number of systems of the first order it is thus also possible to change the frequency response of a system i.e. filter of higher order by merely changing the clock frequency. Filters of the mentioned type and the basic mathematical calculations relevant thereto are well known, for instance from the following publications:

1. Collective works of the Seminar Lectures dealing with digital filters, Winter-term 1968/69, Institute of Technological Physics at the ETH (Federal Institute of Technology) Zurich, published by the Institute of Technological Physics of ETH, Zurich.
2. Introduction to Digital Filters, Novak Schmid, IEE Transactions on Electromagnetic Compatability, Volume EMC-10 No. 2, June 1968.
3. Information Concerning Integrated Circuits No. 19, the "Eimerkettenspeicher", A shift Register for Analog Signals, Philips AG, Zurich, Switzerland.
4. Technical Report No. 115-Analog and Digital Computer Techniques for Approximation of Predetermined Transmission Functions with Transverse Filters, published by Heinrich-Hertz-Institute for Oscillation Research, Berlin, Charlottenburg, Germany.

With the remote transmission or teletransmission of signals via an electrical energy or power supply network it is known to form at the side of the transmitter 100 from a first auxiliary frequency, for instance the network frequency, delivered to the transmitter, a signal frequency which is in a predetermined first relationship to the aforementioned auxiliary frequency, i.e. the network frequency. Systems suitable for this purpose have been taught, for instance, in Swiss Pat. Nos. 370,145 and 447,360. Significant in this respect are also the commonly assigned copending U.S. applications Ser. No. 259,133, filed June 2, 1972, now U.S. Pat. No. 3,778,726, granted Dec. 11, 1973, and Ser. No. 259,075 filed June 2, 1972, now U.S. Pat. No. 3,806,876, granted Apr. 23, 1974, and the disclosure of which are incorporated herein by reference. A different technique for generating a signal frequency which is in a predetermined first relationship to an auxiliary frequency, i.e., the network frequency, has been disclosed for instance in Swiss Pat. No. 454,267, where the signal frequency is obtained by means of a rotating frequency converter. In such Swiss Pat. No. 454,267 there is further disclosed the manner in which there can be formed remote control commands which are superimposed as alternating-current pulses upon a high current power network and how the same can be removed at the side of the receiver of the high current power network. An example of a remote control receiver is disclosed for instance in Swiss Pat. No. 522,313, where there is also disclosed a receiver which transforms the received audio frequency pulses into a digital pulse sequence. The receiver is connected to the high-current conductor, which apart from carrying the network frequency and its rather numerous harmonics, also carries the disturbance voltages. During the transmission of remote control commands there is thus also present the remote control signal with the signal frequency $f_s$. It is the function of the receiver component to selectively receive the signal frequency $f_s$ from the available frequency mixture and to deliver a pulse sequence which corresponds to the remote control command. This delivered pulse sequence can either consist of audio frequency pulses or even of digital pulses. From an alternating-current pulse sequence there can be formed in known manner, by rectification and pulse shaping, a digital pulse sequence.

Since according to the aforementioned prior art publications there has been disclosed and is known in this art the construction of a remote control receiver and its mode of operation, the further discussion given hereinafter therefore will be limited solely to the circuit construction and the mode of operation of the receiver portion and filter which is selectively responsive to the signal frequency.

Figure 3:
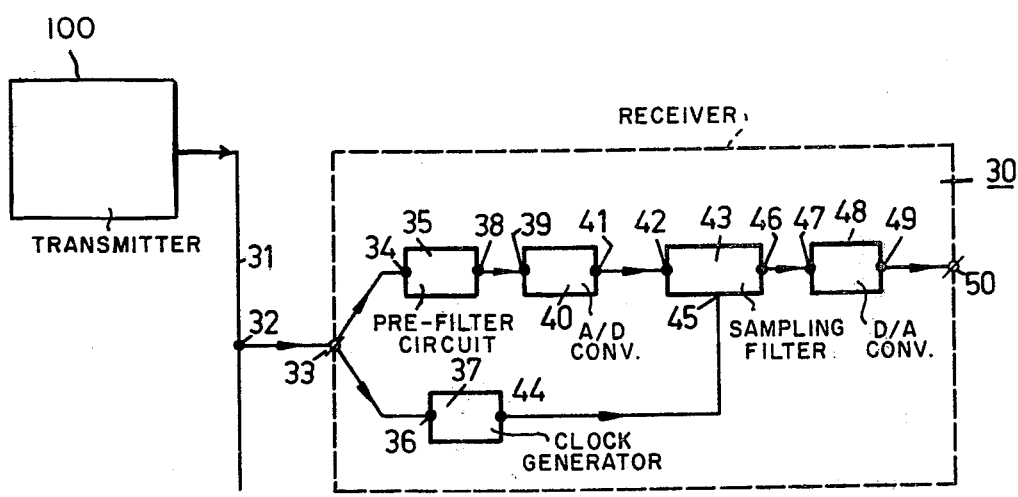
FIG. 3 is a block circuit diagram of a selective receiver component.

FIG. 3 illustrates a block circuit diagram of a selective receiver component or receiver with a sampling filter. The selective receiver component has been generally designated in its entirety by reference character 30. Reference numeral 31 represents a heavy-current or high-current conductor or line on which there is superimposed the signal frequency $f_s$. Connected with a junction or terminal 32 of the heavy-current conductor or line 31 is an input terminal 33 of the receiver component or receiver 30. The input voltage present at the input terminal 33 is delivered both to an input 34 of a pre-filter circuit 35 and an input 36 of a frequency converter or clock generator 37 for generating a clock frequency for the sampling filter 43 of the receiver 30. The pre-filtered input signal is delivered from output 38 of the pre-filter circuit to an input 39 of an analog-digital converter 40. The latter delivers at its output 41 a digital signal corresponding to the momentary magnitude of the input signal, i.e., delivers a numerical value at input 42 of sampling filter 43. The sampling filter 43 is constructed, for instance, as a digital bandpass filter. From an output 44 of the frequency converter 37 there is delivered a clock frequency which controls the throughpass frequency or frequency response of the sampling filter 43 to an input 45 of such sampling filter. The output signal appearing at output terminal 46 of the sampling filter 43 has digital characteristics and, if it is not directly further processed as a digital signal at the remote control receiver, it can be delivered to an input 47 of a digital-analog converter 48. The digital-analog converter 48 delivers from its output terminal 49 an output signal corresponding to the received remote control frequency $f_s$ to an output terminal 50 of the receiver component 30.

Figure 4:
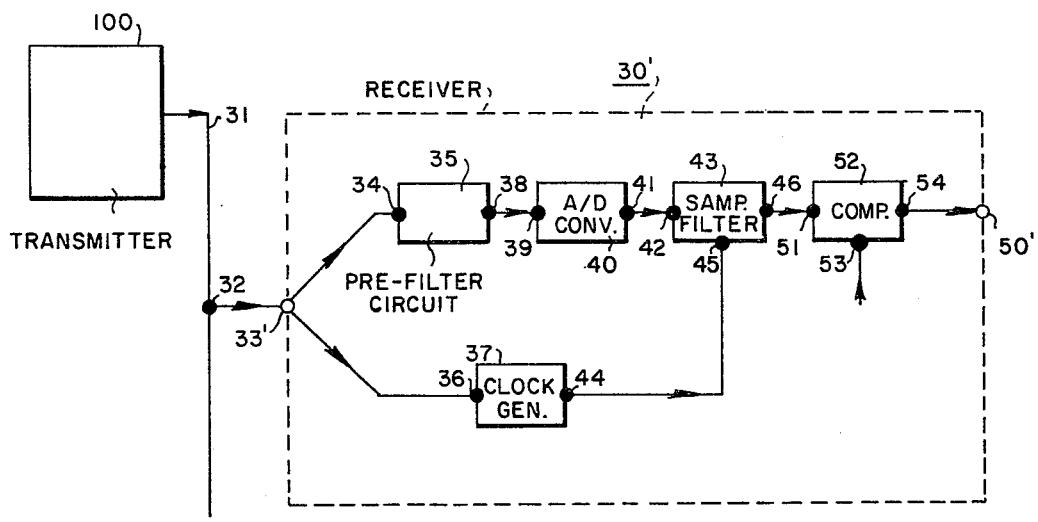
FIG. 4 is a variant construction of the receiver component.

FIG. 4 illustrates as a further exemplary embodiment an advantageous variant construction of a receiver component or receiver, here designated by reference character 30', and again incorporating a sampling filter. With the exception of the last block 52 of the circuit diagram of FIG. 4 the receiver component or receiver 30' coincides with the receiver component 30 described in conjunction with FIG. 3. According to the showing of FIG. 4 the digital output signal of the sampling filter 43 is delivered from its output terminal 46 in digital form as a digital input signal to an input 51 of a digitally functioning comparator 52. The digital comparator 52 receives at a further input terminal 53, for instance by means of fixed wiring, a reference value in digital form and serving as a threshold value. The comparator 52 delivers at its output terminal 54 a logical signal "0" whenever the digital input signal value is below the reference value applied to the reference value input 53. If the aforementioned reference value is reached or exceeded by the input signal appearing at the input 51 then at the output 54 there appears the logical signal "1". It is therefore apparent that the output terminal 50' of the receiver component 30' there appears a digital impulse sequence which corresponds to a received remote control command. The evaluation of such impulse sequence can occur, for instance, in the manner as described in the previously mentioned Swiss Pat. No. 522,313.

There will now be described hereinafter exemplary embodiments for the individual blocks of the circuit diagrams of FIGS. 3 and 4.

Figure 5:
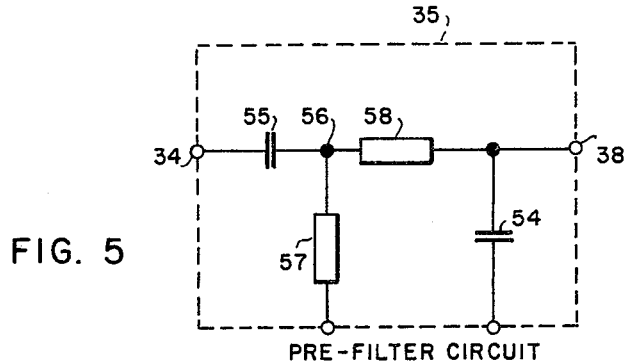
FIG. 5 is a circuit diagram of a pre-filter circuit arrangement.
Figure 9:
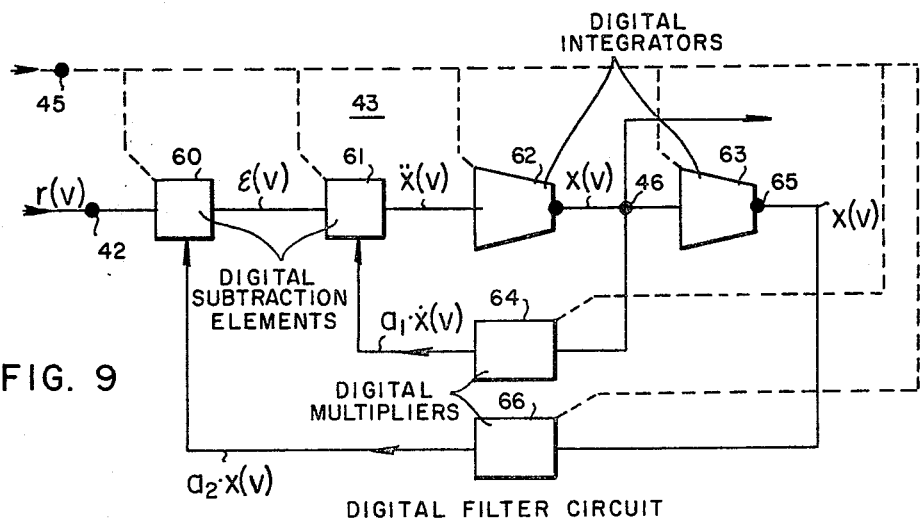
FIG. 9 is a block circuit diagram of a digital filter.

The pre-filter circuit arrangement 35 can be, for instance, an RC-element, the roll-off frequency of which is preferably at least one octave lower than the signal frequency of the sampling filter. Due to these measures the periodicity of its transmission characteristics, which occur with sampling filters, can be influenced, in other words there can be lowered the response sensitivity of the filter and the output voltage by the low-pass represented by the RC-element for harmonics of the signal frequency. If one is concerned with, as in the exemplary embodiment under consideration, the reception of a signal frequency which is superimposed upon a network voltage, wherein the intensity of such signal is in the order of a few percent of the network voltage, it can be then additionally advantageous to construct the pre-filter circuit arrangement 35 such that the network frequency is more markedly suppressed than the signal frequency. This can be achieved, for instance, by means of a high-pass filter circuit arranged forwardly of the aforementiond low-pass filter circuit. FIG. 5 illustrates a circuit diagram of an exemplary embodiment of pre-filter circuit 35. The input signal is delivered from terminal 34 via a capacitor 55 to a circuit junction point 56, at which location a resistor 57 is connected with ground. The capacitor 55 and the resistor 57 constitute a high-pass filter circuit arrangement by means of which the network frequency can be more markedly weakened than the higher selected remote control frequency. Following the circuit junction point or terminal 56 there is connected an RC-element consisting of a resistor 58 and a capacitor 54 constituting a low-pass filter arrangement, the roll-off frequency of this low-pass filter circuit 54, 58, advantageously is selected to be at least one octave lower than the clock frequency, in order that the harmonics of the signal frequency, to which the sampling filter likewise responds, are additionally weakened. Of course, there can be provided as the pre-filter circuit 35 some other type of known filter circuit, for instance an LC-filter or an active RC-filter and so forth.

As the frequency converter 37 for generating the clock frequency from the network frequency and which clock frequency is delivered to the sampling filter there can be chosen, for instance, an arrangement of the type disclosed in FIG. 4 in the catalog "Phase Locked Loop Linear Integrated Circuits" SE 565/NE 565, of Signetics Corporation, Sunnyvale, Calif., USA. In this catalog the input of the frequency converter has been designated by reference numeral 2 and the output by reference numeral 5. This just-mentioned input, designated by reference character 2, corresponds to the input 36 of the circuit described in conjunction with FIGS. 3 and 4. The aforementioned output 5, in the exemplary description corresponds to the output 44 of FIGS. 3 and 4.

Furthermore, as the analog-digital converter 40 there can be used for instance type ADC 590-8 obtainable from Hybrid Systems Corporation, of Burlington, Mass. Details concerning such commercially available analog-digital converter are disclosed in the publication "Data Conversion Products 1972 Condensed Catalog" of this company under the aforementioned commercial code designation.

As the digital-analog converter 48 there can be used, for instance, the commercially available type DAC-326 of said Hybrid Systems Corporation. Also additional details concerning this digital-analog converter can be found in the above-mentioned publication of such company.

As the digital comparator 52 (FIG. 4) there can be employed for instance a 4-bit magnitude-comparator of the commercial type SN7475 available from Texas Instruments Inc. Deutschland GmbH. Further particulars concerning this digital comparator appear in the catalog entitled "The Integrated Circuits Catalog for Design Engineers", Texas Instruments Inc., Second Edition-CC-401/12715 under the aforementioned code designation.

Figure 6:
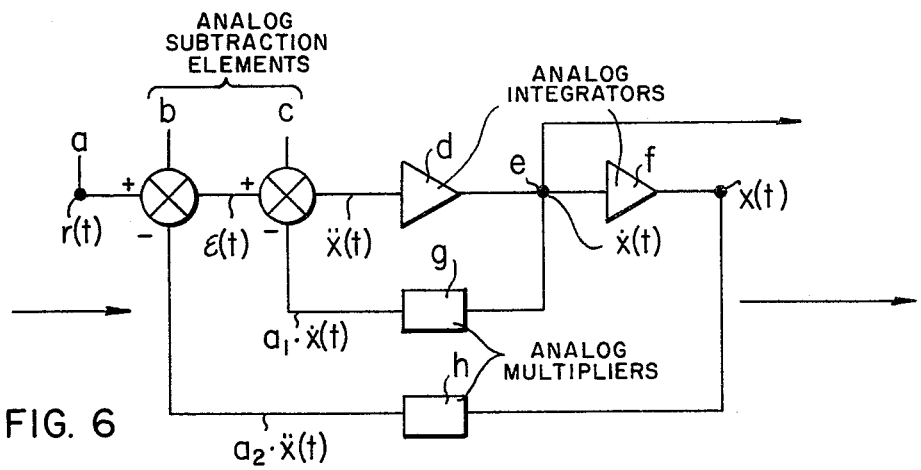
FIG. 6 illustrates the principal construction of a filter circuit.
Figure 6A:
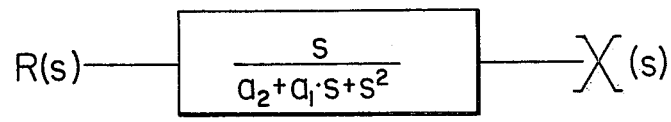
FIG. 6a illustrates the transmission characteristic of the filter depicted in FIG. 6.

For the purpose of explaining the construction and mode of operation of an exemplary embodiment of sampling filter 43 there is first considered an analog filter with the same transmission characteristics, on the basis of the illustration of FIGS. 6 and 6a.

In FIG. 6 reference character $a$ designates an input terminal for an input signal $r(t)$. At the input terminal $a$ there is connected a first analog subtraction element $b$ following which there is connected a second analog subtraction element $c$. The output signal $\ddot{x}(t)$ of the second analog subtraction element $c$ is delivered to a first analog integrator $d$, the output signal $\dot{x}(t)$ appearing at a terminal $e$. This output signal $\dot{x}(t)$ at the same time constitutes the output signal of the analog bandpass filter according to FIG. 6.

The output signal $\dot{x}(t)$ is delivered from the terminal $e$ via a first analog multiplier $g$ to the second analog subtraction element $c$. The output signal $x(t)$ of the second analog integrator $f$ is delivered via a second analog multiplier $h$ to the first analog subtraction element $b$.

The difference between the input signal $r(t)$ and an output signal $a_2.x(t)$ of the second analog multiplier $h$ is formed at the first analog subtraction element $b$ and is delivered as a signal $\epsilon(t)$ to the second analog subtraction element $c$.

The difference between the aforementioned signal $\epsilon(t)$ and an output signal $a_1.\dot{x}(t)$ of the first analog multiplier $g$ is formed in the second analog subtraction element $c$ and has been designated in FIG. 6 by $\ddot{x}(t)$.

FIG. 6a illustrates an analog bandpass filter arrangement according to FIG. 6 in conventional block illustration. In this showing the following symbols represent:

$R(s)$ = the Laplace-transformed input signal
$X(s)$ = the Laplace-transformed output signal
$s$ = complex frequency
$a_1$ = multiplication factor of the first multiplier $g$
$a_2$ = multiplication factor of the second multiplier $h$.

With this transmission function the poles are determined by the null position of the denominator, i.e., by $$a_2 + a_1 s + s^2 = 0$$

that is to say, the poles are completely determined by $a_1$ and $a_2$.

Resonant circuit frequency and quality are determined by the following relationships or equations:

$$\omega_o = \sqrt{a_2 - (a_1^2/4)}$$

$$\phi = (1/a_1) \cdot \sqrt{a_2}$$

As can be seen by referring to FIG. 6 such an analog bandpass filter can be constructed with three different analog function blocks, namely subtraction elements, integrators and multipliers.

Figure 7:
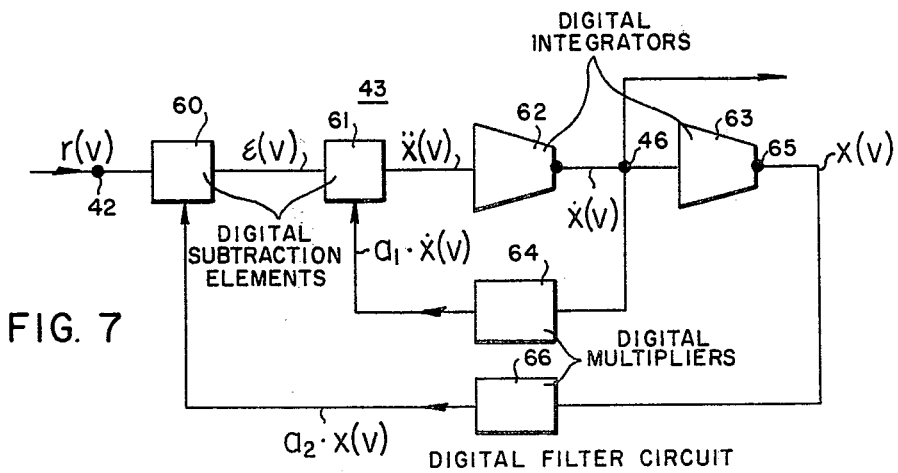
FIG. 7 is a block circuit diagram of a digital filter.

By digital construction of such function blocks there is formed a digital filter, as such has been depicted by the block circuit diagram of FIG. 7. Since starting from analog filters, function block for function block is digitized, the structure of such digital filter according to FIG. 7 is similar to that of the analog filter according to FIG. 6.

An input terminal 42 of the sampling filter 43 (compare FIG. 7) has delivered thereto a digital input signal $r(v)$ and via a first digital subtraction element 60 and a second digital subtraction element 61 such is delivered to a first digital integrator 62. Following the first digital integrator 62 there is arranged a second digital integrator 63. The digital output signal of the first integrator 62 is delivered to a terminal 46.

From the output of the first digital integrator 62, i.e., from the terminal 46 there is fedback via a first digital multiplier 64 a signal $a_1 \cdot \dot{x}(v)$ to the second digital subtraction element 61. From the output 65 of the second digital integrator 63 there is fedback an output signal $x(v)$ via a second digital multiplier 66 in the form of the signal $a_2 \cdot x(v)$ to the first digital subtraction element 60.

There will hereinafter now be described the manner in which the digital constructions of the aforementioned three function blocks (subtraction elements, integrators and multipliers) are realized.

Subtraction element

For this purpose there can be employed for instance a circuit of the type disclosed in Figures 8 to 25 (page 217) of Electronic Digital Techniques
Paul M. Kintner
1968, McGraw Hill Book Company,
New York City, New York.

Multiplier

As the multiplier there can be employed for instance a circuit as disclosed for instance in Figures 8 to 26 (page 217) of Electronic Digital Techniques
Paul M. Kintner
1968, McGraw-Hill Book Company,
New York City, New York.

Integrator

A digital integrator can be constituted for instance by a rate-multiplier and a forward-backwards counter. As the rate-multiplier there can be employed, for instance, the integrated circuit type SN 7497 of Texas Instruments Inc., whereas as the fowards-backwards counter there can be used, for instance, the integrated circuit type SN 74191 of the same company. The aforementioned circuits are described in the previously mentioned catalogs of Texas Instruments Inc. The principal function of such digital integrator will be explained in conjunction with FIG. 8.

The circuit consists of a clock generator 900 which is coupled with a clock input 901 of a rate-multiplier 902. The binary signal A to be integrated is delivered to a terminal 903 and transmitted through the agency of a conductor line 904 to a signal input 905 of the rate-multiplier 902. Additionally the signal to be integrated is delivered by a conductor or line 906 to an input 907 of a control device 908. An output 909 of this control device 908 is connected via a conductor or line 910 with an input 911 of a forwards-backwards counter 912.

An output 913 of the rate-multiplier 902 is connected via a conductor 914 with a first input 915a of an AND-gate 915, whereas a further output 916 of the control device 908 is connected via a conductor 917 with a further input 915b of the AND-gate 915. The output 918 of this AND-gate 915 is connected via a conductor 919 with a clock input 920 of the forwards-backwards counter 912. Finally, the signal which represents the integrated input signal A can be removed from the counter 912 at a terminal 921 and via a conductor 922 at terminal 923.

Figure 8:
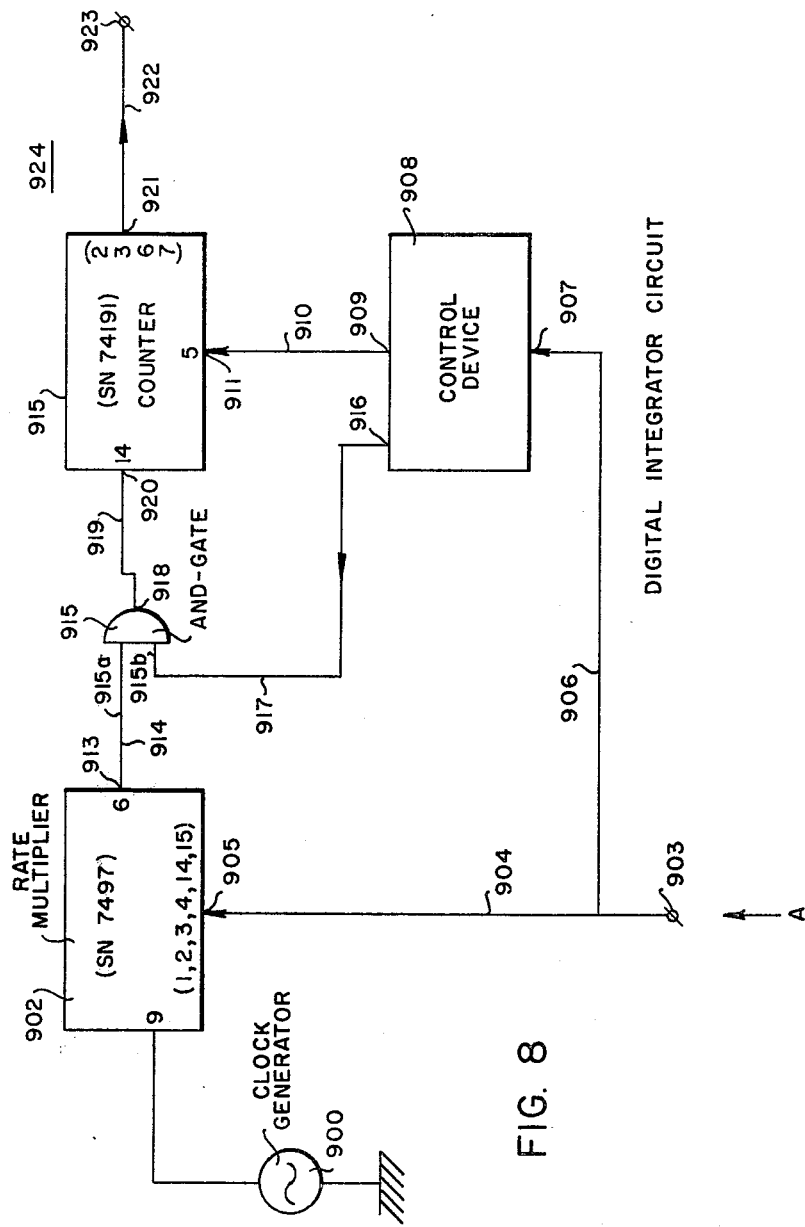
FIG. 8 is a block circuit diagram of a digital integrator.

The mode of operation of the digital integrator 924 of FIG. 8 is as follows: as will be apparent from the description of the rate-multiplier 902 of the aforementioned catalog the frequency of the digital output signal at the terminal 913 is proportional to the value of the binary input signal A at the signal input 905. Consequently, the frequency of the signal at the terminal 913 is proportional to the signal A which is to be integrated. Now if at the terminal 916 of the control device 908 there appears a logical signal 1 then the output signal of the rate-multiplier 902 arrives from the terminal 913 through the agency of conductor 914, via the gate 915 and via conductor 919 to the clock input 920 of the forwards-backwards counter 912. Consequently, the frequency of the clock signal at the terminal 920 of the forwards-backwards counter 912 is proportional to the magnitude of the signal A to be integrated. With large values of the signal A the output signal at the terminal 923 increases or decreases more rapidly than for small values of the signal A. The determination whether the output signal at the terminal 923 must be larger or smaller is carried out at the control device 908 and is dependent upon the sign of the signal A to be integrated.

As already mentioned sampling filters, apart from the signal input, always possess at least one control input. The sampling filter 43 (FIG. 3) therefore also possesses a control input 45. For each clock pulse at this control input the digital filter calculates new values for $(v)$, $\ddot{x}(v)$, $\dot{x}(v)$, $x(v)$ $a_1 \cdot \dot{x}(v)$ and $a_2 \cdot x(v)$, because the clock signal is delivered via the broken line depicted connections in FIG. 9 to the control devices of the subtraction elements 60 and 61, the integrators 62 and 63 and the multipliers 64 and 66 (compare FIG. 9).

While there is shown and described present preferred embodiments of the invention, it is to be distinctly understood that the invention is not limited thereto, but may be otherwise variously embodied and practiced within the scope of the following claims.

Accordingly, what is claimed is:

1. In an apparatus for the reception of remotely transmitted signals, which signals are transmitted via a conductor, especially via an electrical energy supply network, wherein there is provided a transmitter controlled by a first auxiliary frequency for generating a signal frequency which is in a first predetermined relationship to said first auxiliary frequency; a receiver; transmission channel means interposed between said transmitter and receiver for transmitting a signal characteristic of the first auxiliary frequency and for further transmitting the signal frequency between the transmitter and the receiver;

the improvement comprising:
 a. the receiver incorporating at least one digital sampling filter, said digital sampling filter having a first input to which there is delivered a signal as sampling pulses possessing a predetermined repetition frequency and further having a second input to which there is delivered the signal frequency as the received signal, the signal serving as the sampling pulses being defined by the auxiliary frequency; and
 b. wherein the response frequency of the digital sampling filter can be controlled by means of said repetition frequency of said sampling pulses.

2. The apparatus as defined in claim 1, wherein said receiver further includes pre-filter circuit means arranged ahead of the digital sampling filter of the receiver in order to suppress predetermined undesirable operating aspects of the response frequency which occur at the digital sampling filter.

3. The apparatus as defined in claim 1, wherein the digital sampling filter has an input side and an output side, an analog-digital converter electrically connected to the input side of the digital sampling filter and a digital-analog converter electrically connected to the output side of the digital sampling filter, the analog-digital converter having an input and an output and the digital-analog converter having an input and an output, a computer having an input and an output, the input of the computer being connected to the output of the analog-digital converter and the output of the computer being connected to the input of the digital-analog converter.

4. The apparatus as defined in claim 1, wherein the receiver has an input, clock generator means coupled to said input of the receiver, said clock generator means having a clock signal output, the digital sampling filter having a clock input, the clock signal output of the clock generator means being connected to the clock input of the digital sampling filter.

5. The apparatus as defined in claim 1, said receiver further including a pre-filter circuit arrangement having an input and an output, the receiver having an input and an output, the input of the pre-filter circuit arrangement being connected to the input of the receiver, an analog-digital converter having an input and an output, the output of the pre-filter circuit arrangement being electrically coupled to the input of the analog-digital converter, said digital sampling filter comprising a computer having an input and an output, the output of the analog-digital converter being connected to the input of the computer, the computer having a clock input, clock generator means having an input and an output, the input of the receiver being connected to the input of the clock generator means and the output of said clock generator means being connected to the clock input of the computer and, digital comparator having a first input and a second input, the output of the computer being connected to the first input of the digital comparator and a digital threshold value carried by the other input of the digital comparator, the digital comparator having an output which is connected to the output of the receiver.

6. The apparatus as defined in claim 1, wherein said digital sampling filter comprises a digital bandpass filter with a cascade circuit of a first digital subtraction element having a first input and a second input and an output, a second digital subtraction element having a first input and a second input and an output, the output of the first digital subtraction element being connected to the first input of the second digital subtraction element, a first digital integrator and a second digital integrator, each integrator having a respective output, the output of the first integrator being connected via a first digital multiplier to the second input of the second subtraction element and the output of the second integrator being connected via a second digital multiplier to the second input of the first subtraction element.

7. A method for the reception of signals transmitted via a conductor, especially via an electrical energy supply network, wherein there is formed at the transmitter end of a transmitting and receiving system from a first auxiliary frequency delivered to the transmitter end a signal frequency which is in a predetermined first relationship to the first auxiliary frequency; and there is transmitted from the transmitting system to the receiving system an auxiliary signal characteristic of the first auxiliary frequency, and there is further transmitted the signal frequency from the transmitting system to the receiving system;

the improvement comprising the steps of:
 a. forming at the receiver end of the receiving system from the signal characteristic of the first auxiliary frequency a signal which is in a predetermined second relationship to the first auxiliary frequency; and
 b. delivering said signal which is in a predetermined second relationship to the first auxiliary frequency to a digital sampling filter for controlling the frequency response of said digital sampling filter.

8. The method as defined in claim 7, wherein said signal which is in a predetermined second relationship to the first auxiliary frequency constitutes a second auxiliary frequency.

9. The method as defined in claim 7, wherein said signal which is in a predetermined second relationship to the first auxiliary frequency is a clock frequency.

10. In an apparatus for the reception of remotely transmitted signals, which signals are transmitted via a conductor, especially via an electrical energy supply network, wherein there is provided a transmitter controlled by a first auxiliary frequency for generating a signal frequency which is in a first predetermined relationship to said first auxiliary frequency; a receiver; transmission channel means interposed between said transmitter and receiver for transmitting a signal characteristic of the first auxiliary frequency and for further transmitting the signal frequency between the transmitter and the receiver;
the improvement comprising:
a. the receiver incorporating at least one digital sampling filter; said digital sampling filter having a first input to which there is delivered a signal as sampling pulses possessing a predetermined repetition frequency and further having a second input to which there is delivered the signal frequency as the received signal, the signal serving as the sampling pulses being a clock frequency derived from the first auxiliary frequency; and
b. wherein the response frequency of the digital sampling filter can be controlled by means of the repetition frequency of said sampling pulses.

* * * * *

UNITED STATES PATENT OFFICE
CERTIFICATE OF CORRECTION

PATENT NO. : 4,007,360
DATED : February 8, 1977
INVENTOR(S) : ROGER KNIEL and HANS DE VRIES It is certified that error appears in the above-identified patent and that said Letters Patent are hereby corrected as shown below:

Column 9, line 22, delete "$\phi$" and insert in place thereof --Q--.

Signed and Sealed this

Fourteenth Day of June 1977

[SEAL]

Attest:

RUTH C. MASON
*Attesting Officer*

C. MARSHALL DANN
*Commissioner of Patents and Trademarks*